United States Patent [19]

Moore et al.

[11] Patent Number: 4,578,195

[45] Date of Patent: Mar. 25, 1986

[54] PROCESS FOR THE PURIFICATION OF EFFLUENTS AND PURGE STREAMS CONTAINING TRACE ELEMENTS

[75] Inventors: Sanders H. Moore; Maurice R. Smith, both of Cleveland; Harvey B. Cochran, Englewood, all of Tenn.

[73] Assignee: Olin Corporation, Cheshire, Conn.

[21] Appl. No.: 634,837

[22] Filed: Jul. 26, 1984

Related U.S. Application Data

[63] Continuation-in-part of Ser. No. 426,340, Sep. 29, 1982, abandoned.

[51] Int. Cl.$^4$ .............................................. C02F 1/28
[52] U.S. Cl. .................................. 210/679; 210/681; 210/683; 210/684; 210/688; 210/751; 210/906; 210/911; 210/912; 210/913; 210/914
[58] Field of Search ................. 204/99; 210/661, 679, 210/688, 660, 670, 683, 906, 907, 681, 682, 684, 685, 686, 687, 751, 911–914

[56] References Cited

U.S. PATENT DOCUMENTS

| | | | |
|---|---|---|---|
| 2,645,621 | 7/1953 | D'Alelio | 210/679 |
| 2,742,381 | 4/1956 | Weiss et al. | 210/661 |
| 3,039,865 | 6/1962 | Gilbert et al. | 75/81 |
| 3,213,006 | 10/1965 | Crain et al. | 204/99 |
| 3,536,597 | 10/1970 | Yamori et al. | 204/99 |
| 3,785,942 | 1/1974 | Carlson | 204/99 |
| 3,801,480 | 4/1974 | Krieg | 204/99 |
| 3,935,098 | 1/1976 | Oda et al. | 210/38 |
| 4,053,401 | 10/1977 | Fukushima et al. | 210/912 |
| 4,124,459 | 11/1978 | Blanch et al. | 204/99 |
| 4,151,077 | 4/1979 | Nogueira et al. | 210/21 |
| 4,160,730 | 7/1979 | Nguyen | 210/48 |

OTHER PUBLICATIONS

"Concentration of Heavy Metals by Complexation on Dithocarbamate Resins" by Joseph F. Dingman, Jr., Kenneth M. Gloss, Ellen A. Milano and Sidney Siggia in *Analytical Chemistry*, vol. 46, No. 6, pp. 774–777, May 1974.

"Selective Concentration and Determination of Trace Metals Using Poly(Dithiocarbamate) Chelating Ion--Exchange Resins" by Dennis S. Hackett and Sidney Siggia in Environmental Analysis, Edited by Galen W. Ewing, Academic Press, Inc., New York, New York, 1977, pp. 253–265.

"Chelex 100 Chelating Ion Exchange Resin for Analysis, Removal or Recovery of Trace Metals", Bio.Rad Laboratories, Chemical Division, Product Information Sheet 2020, pp. 1–5, Mar. 1981.

Miyazaki, Akira and Barnes, Ramon M., "COMPLEXATION OF SOME TRANSITION METALS, RARE EARTH ELEMENTS, AND THORIUM WITH A POLY (DITHIOCARBAMATE) CHELATING RESIN" Analytic Chemistry, vol. 53, 1981, pp. 299–304

*Primary Examiner*—Ivars Cintins
*Attorney, Agent, or Firm*—James B. Haglind; Donald F. Clements

[57] ABSTRACT

An improved process for treating aqueous effluents and purge streams to selectively remove polluting elements such as iron, copper, lead and mercury therefrom is described. The procedure comprises contacting the effluent with a poly(dithiocarbamate) chelating agent whereby the polluting elements are absorbed. The resin is extracted with an acidic aqueous solution having a pH of from about 4 to about 6; and removing the resin. When this is done, the residual content of these polluting elements in the effluent is reduced to a level below EPA required levels so that the effluent can safely be discharged into the surrounding ecosystem. The poly(dithiocarbamate) resin containing the polluting elements can be disposed of, for example, by being deposited in an unsecured landfill.

23 Claims, No Drawings

PROCESS FOR THE PURIFICATION OF EFFLUENTS AND PURGE STREAMS CONTAINING TRACE ELEMENTS

This is a continuation-in-part application of application Ser. No. 426,340, filed Sept. 29, 1982, now abandoned.

BACKGROUND OF THE INVENTION

This invention relates to a method of removing trace elements from aqueous solutions and more particularly to the treatment of effluents and purge streams containing dissolved mercury and other contaminating elements.

One major problem in the chemical industry is the removal of an increasingly large number of pollutants from waste water and other process streams. Following the lead of the Federal Water Pollution Control Act of 1972 (commonly referred to as the "Clean Water Act"), many states, counties, and even cities are posting ever more stringent regulations concerning the discharge of a wide variety of polluting materials, both organic and inorganic. One group of materials causing particular concern is the 'priority' pollutants as established under Section 307 of the Clean Water Act. These have been determined to present unusual hazards in terms of toxicity, carcinogenicity and/or mutagenicity. Presently included in this list are ions and salts of some 13 elements which, along with the current federal drinking water and maximum allowable river discharge limits, are given in Table I.

TABLE I

| EPA Priority Pollutant Elements | Maximum Allowable Concentrations (ppm) |
|---|---|
| Antimony | 0.15 |
| Arsenic | 0.05 |
| Beryllium | 0.000037 |
| Cadmium | 0.01 |
| Chromium | 0.05 |
| Copper | 1.0 |
| Lead | 0.05 |
| Mercury | 0.002 |
| Nickel | 0.013 |
| Selenium | 0.01 |
| Silver | 0.05 |
| Thallium | 0.013 |
| Zinc | 5.0 |

In treating aqueous streams to remove these elements, it is found that these elements are present in various forms including cationic, anionic, non-ionic elements or complexes, or bound in suspended particulates. Consequently, a plurality of treatments may be necessary to more or less completely remove them. This imposes a significant capital and operating cost penalty on any facility which is required to handle complex process chemicals in waste water streams, especially those having several of these pollutants present at the same time.

This situation arises, for example, in the chlor-alkali industry where anolyte brines removed from membrane or mercury cells nominally contain amounts of metal contaminants such as cadmium, chromium, copper, lead, nickel, and zinc which exceed the EPA maximum allowable discharge limits. In addition, these brines contain contaminating amounts of metals such as titanium and iron while mercury cell effluent brines contain mercury concentrations in the range of 1 to 20 parts per million (ppm). The brines also contain substantial amounts of non-pollutant sulfate, chlorate and alkaline earth metal ions such as calcium and magnesium as well, all in a concentrated brine of the alkali metal being electrolyzed. Where, in the past, part of the brine was periodically purged by discharging into waterways, to provide, for example chlorate and sulfate control, this is no longer possible in many locations.

This problem has been recognized for quite some time and a variety of approaches have been developed to solve it. Many of these involve treating either the dechlorinated brine or the purge stream with one or more chemicals either to reduce the dissolved mercury and other heavy metals to the metallic form or convert them to insoluble products, such as sulfides, which can be filtered out. Such treatments are often quite vigorous since, for example, mercury in concentrated brine solution is known to form complexes which are very stable. In still other cases, the brine is treated with hydrocarbons or other solvents to extract these complexes, but whichever of these methods is used, they all share the common problems of added costs and complexity in what is basically a low cost/high volume process.

One approach to pollution abatement which appears to offer unusual cost effectiveness is the use of one or more chelating agents as absorption compounds. Capable of operating in a wide variety of chemical environments, such materials are finding wide use in treating process and waste water streams to selectively remove a considerable number of heavy metal compounds. However, most, if not all, of the commercially available agents used for this purpose are quite expensive and are sensitive to dissolved calcium and magnesium. Thus, for many applications, their real utility in comparison to alternative methods for treating purge streams is quite limited.

One group of chelating agents showing unusual promise are poly(dithiocarbamate) resins such as those prepared by Dingman et al, Hackett and Siggia, and Miyazaki and Barnes.

Dingman et al prepared poly(dithiocarbamate) resins having a sulfur content of 9.5% by reacting equal amounts by weight of polyethyleneimine with toluene diisocyanate, using dioxane as the solvent. The reaction product was further treated with carbon disulfide and allowed to react for three weeks (Analytical Chemistry 46, No. 6, pages 774–777, May, 1974). The poly(dithiocarbamate) resins were found to be able to chelate a heavy metal ion such as silver, mercury, copper, lead and nickel from its aqueous solution.

Hackett and Siggia reported the preparation of poly(dithiocarbamate) resins in 'Selective Concentration and Determination of Trace Metals Using Poly(dithiocarbamate) Chelating Ion-Exchange Resins' in *Environmental Analysis*, edited by G. W. Ewing, Academic Press, Inc., New York, New York 1977, pages 253–265.

Their procedure for making these resins comprised reacting, in dioxane solution, an 8:1 mixture of an anhydrous polyethyleneimine-1800 molecular weight and a polymethylene polyphenylisocyanate to form a solid polyamine-polyurea crosslinked precursor. This, in turn, was reacted with a mixture of $NH_4OH$ and $CS_2$ in isopropyl alcohol over a period of about 4 weeks to form resins having a sulfur content of about 18 percent and an equivalent $Cu^{+2}$ capacity (milliequivalents of Cu absorbed/gram of dry resin from an aqueous solution at a pH of about 4.8) of between about 0.8 and 1.35. Hackett and Siggia removed heavy metals such as these studied by Dingman et al from solutions including sea water and milk.

Miyazaki and Barnes have reported (Analytical Chemistry, 53, No. 2, pages 299–304, Feb., 1981) that the NH OH/$CS_2$ reaction time in the method of Hackett and Siggia can be reduced to as short a time as 8–16 hours. The poly(dithiocarbamate) resin prepared had a sulfur content of about 18 percent and was used in the chelation of rare earth elements and metals including chromium, titanium, vanadium, molybdenum, tungsten, and osmium from aqueous solutions.

The common elements in these prior art studies are the use of dioxane as the solvent; anhydrous polyethyleneimine used as a precursor reactant and the belief that a high sulfur content resin was required to effectively remove metal contaminants. Dioxane is a federally listed health hazard and it would be highly desirable if less hazardous solvents could be used. It is known that polyethyleneimine can be supplied as an aqueous suspension at attractive prices. However, it is, at best, only sparingly soluble in dioxane and attempts to form a satisfactory precursor resin from such a material almost invariably end in failure. The reason for this appears to be that the water in the suspension saturates the dioxane thus effectively inhibiting its ability to dissolve the polyimine so that very little, if any, is available to react with the polyisocyanate. In addition, the processes of the prior art for preparing poly(dithiocarbamate) resins employ high ratios of polyethyleneimine to polyisocyanate which result in increased raw material costs. Further, the poly(dithiocarbamate) resins containing chelated priority pollutants and contaminants must be properly disposed of in a way which minimizes both disposal costs and environmental risks.

OBJECTS OF THE INVENTION

It is thus the object of the present invention to provide an efficient method for selectively chelating and removing dissolved heavy metals from aqueous effluents and discharged purge streams and disposing of the heavy metals in non-hazardous ways.

It is a further object of the present invention to provide a process for removing selected light metals from aqueous effluents.

Another object of the present invention is to provide a process for effectively removing selected non-metals from aqueous effluents.

An additional object of the present invention is to provide a process for effectively removing nickel and cobalt from aqueous effluents.

These and other objects of the invention will become apparent from the following description and the appended claims.

DETAILED DESCRIPTION OF THE INVENTION

The process of the present invention is an improved procedure for removing and disposing of heavy metals and other contaminants dissolved in aqueous effluents and purge streams. The dissolved heavy metal ions are removed by contacting the streams with a poly(dithiocarbamate) resin chelating agent.

A suitable method for producing these resins proceeds in two stages. In the first stage, a polyimine such as polyethyleneimine is reacted with an aromatic or aliphatic polyisocyanate to produce a crosslinked polyamine-polyurea precursor resin. The precursor resin is then reacted with a mixture of $NH_4OH$ and $CS_2$ to produce the poly(dithiocarbamate) resin.

Polyimines useful for producing the poly(dithiocarbamate) resins include polymers of alkeneimine compounds having an average molecular weight ranging from about 1000 to about 100,000, preferably from about 1,500 to about 80,000, and having the general formula:

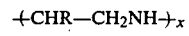

where R is H or an alkyl group having from 1 to about 4 carbon atoms; and X is a positive number large enough to provide the desired molecular weight for the polyimine. Suitable polyimines include polymers of ethyleneimine, 2-methylethyleneimine, 2-ethylethyleneimine, 2,2-dimethylethyleneimine, 2-propyl ethyleneimine, 2-isopropylethyleneimine, 2-butylethyleneimine, and 2-isobutylethyleneimine. Preferred as polyimines are polymers of ethyleneimine, 2-methylethyleneimine, and 2-ethylethyleneimine, with polymers of ethyleneimine being most preferred. The polyimine employed as a starting material may be in any available from such as an anhydrous solid, a solution or aqueous suspension. The polyimine is preferably added to the reaction mixture as a solution where the solvent is any aliphatic alcohol having between about 1 and about 6 carbon atoms including methanol, ethanol, propanol, isopropanol, butanol, isobutanol, sec-butanol, tert-butanol and pentanol, cyclohexanol or mixtures thereof, with isopropyl alcohol being preferred.

Suitable polyisocyanates include aromatic polyisocyanates such as toluene diisocyanate (2,4 and 2,6-isomers), methylene diphenylisocyanate having the formula

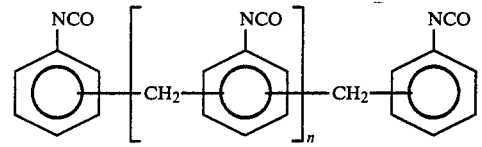

where n=0, 1, 2, 3;
and aliphatic diisocyanates such as hexamethylene diisocyanate having the formula:

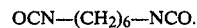

When added to the reaction mixture, the polyisocyanate is preferably in solution form, with ether solvents having from about 2 to about 6 carbon atoms in each chain being preferred, and diethyl ether being particularly preferred.

The precursor resin produced by the reaction of the polyimine and polyisocyanate will be a function of the starting materials used and the ratio of the reactants. Satisfactory precursor resins are produced where the polyimine/polyisocyanate weight ratio is between about 1.5:1 to about 3.0:1. Where methylene diphenyl isocyanate (MDI) is employed as the polyisocyanate reactant, a mixture of methylene diphenyl isocyanates where n is 0, 1 and 2 is preferred, and more preferably a mixture where n is 0 and 1. This provides an isocyanate functionality in the range of 2.0 to about 3.5, and more preferably in the range of 2.0 to about 2.3.

The poly(dithiocarbamate) resin products employed in the novel process of this invention are prepared by suspending the precursor resin in, for example, an aliphatic alcohol of the type used as the polyimine solvent such as isopropanol. The suspension is then admixed with a mixture of concentrated $NH_4OH$ and $CS_2$. The amount of $CS_2$ present is at least equivalent to the amine groups on the precursor resin which are available for substitution. Preferably an excess of $CS_2$ is employed. The ratio of concentrated ammonium hydroxide to carbon disulfide is generally in the range from about 1:1 to about 1:4 and preferably from about 1:2.5 to about 1:3.5. The resin is digested therein for a period of between about 8 and about 20 hours. This produces a flaked chelating resin which, after a final washing to remove the unused reactants and alcohol, is immediately usable.

Using the polyimine/polyisocyanate weight ratios defined above, a preferred embodiment of the poly(dithiocarbamate) resin employed in the process of the present invention is that produced by the reaction of polyethyleneimine with methylene diphenyl isocyanate having a functionality in the range of 2.0 to about 3.5. The chelating resin produced has a sulfur content of between about 6 and about 7 percent and an equivalent $Cu^{+2}$ capacity of between about 1.5 and about 2.5.

To suit particular needs, the resin can be prepared in several forms. For example, while naturally forming in the shape of beads or granules, it can be ground to produce a powder. Further, various means can be utilized to enlarge the specific surface area ($m^2/q$) of the resin so as to enhance its chelating capacity. One such means is the use of a carrier material which holds the resin either in an impregnated state or as a covering on its surfaces. For this, many types of carriers may be used but porous materials having specific surface areas of at least about 1 $m^2/g$ are preferred. Such materials readily available include diatomaceous earth, pumice stone, zeolite, ground coke, activated charcoal, graphite, bentonite and open cell foamed urethane resins. For maximum absorption effectiveness, the carrier particle size should be between about 0.05 to about 2.0 mm in diameter.

In the novel process of the present invention, the lower sulfur value of the poly(dithiocarbamate) resin, as compared, for example, to that described by Dingman et al and Hackett and Siggia, does not seem to negatively affect the overall capabilities of the finished resin to remove contaminants from aqueous effluents. For example, from an aqueous effluent having a pH of about 7 and initial contaminant concentrations of 0.5 ppm, the poly(dithiocarbamate) resin with a sulfur content of 6–7 percent will remove in a single pass 98+ percent of 10 of the 13 element defined as 'priority' pollutants under Section 307 of the Federal Clean Water Act from aqueous solutions.

It has also been found that the resin can sequester a number of other pollutants as well. Thus, at a pH of about 7, it will remove 98+ percent of dissolved iron, titanium, cobalt, molybdenum, silicon and vanadium, and substantial amounts of any manganese and phosphorous present. These results are obtainable whether the contaminants are present singly or are present in effluents in combination with others. More particularly, heavy metals readily removed by the novel process of the present invention include those metals in Groups IB, IIB, IVB, VB, VIB, VIIB and VIII of the Periodic Table of Elements. Group IB heavy metals removed by the poly(dithiocarbamate) resins to concentrations substantially below EPA's maximum allowable concentrations include, for example, copper and silver. The novel process is particularly effective for the Group IIB metals zinc, cadmium, and mercury. Titanium (Group IVB) and vanadium (Group VB) can also be substantially removed from aqueous effluents by the process of the present invention. Group VIB metals and Group VIIB metals recovered from aqueous effluents include chromium, molybdenum, and manganese, respectively. Iron, nickel, and cobalt (Group VIII) are also very effectively removed by the process of the present invention.

In addition, other metals and non-metals whose concentrations in aqueous effluents can be reduced considerably include aluminum, silicon, and selenium. Surprisingly, beryllium is effectively removed by the process of the present invention while other members of Group IIA such as calcium and magnesium are substantially unaffected.

In the process of this invention, various conventional methods of absorption may be utilized. These include simple stirred contact for batchwise operation or packed tower systems for continuous operation either in fixed bed or in fluidized bed modes. In fixed bed operation, it is immaterial whether up-flow or down-flow is used. For continuous flow operation, the space velocity (ml/min./$cm^3$ of resin) should be between about 2 and about 30 with about 5 to about 10 being preferred. Absoprtion efficiency can be improved even further by series operation of two or even three absorption stations. These latter would primarily act as polishing operations to remove any small amounts of residual mercury and other heavy metal contaminants in the brine.

The resin is largely insensitive to the presence of dissolved sodium, calcium, and magnesium ions ranging, in the case of chloride brines, in concentrations from quite dilute up to fully saturated. In purge streams, sulfate ion concentrations (as $Na_2SO_4$) as high as about 100 g/l have caused no operating difficulty. Further, when used with brines as produced in modern mercury cathode or membrane chlor-alkali cells, it is unaffected by the concentrations of $NaClO_3$ typically found therein (nominally 3–4 g/l).

In terms of mercury removal, it is capable of handling, under these conditions, concentrations up to at least about 130 ppm with no apparent diminution of absorption efficiency. This is considerably above the Hg levels found in anolyte brines removed from modern mercury cells. Further, the resin shows no signs of swelling or other significant physical degradation as a result of long-term exposure to such brines at temperatures ranging from ambient to about 100° C. Thus, it can be utilized on the purge stream discharged before or after pH adjustment. However, treatment after pH adjustment (if necessary) to a value of between about 3 and about 9 with a fixed bed mode of operation is preferred. In such use, the resin exhibits a large capacity for mercury, whether as $Hg^{+2}$ ions or as a non-ionic mercury-chloride complex with absorption values as high as about 10 meq Hg/g of resin and an absorption efficiency of about 97–99 percent being easily achieved.

Once the stream has been cleansed of mercury, it may be safely treated for calcium and magnesium removal, if necessary, and discharged.

Until recently, chromium compounds were widely used in corrosion treatment of cooling tower waters. EPA and other governmental regulations have, however, substantially replaced the use of chromium compound with less effective corrosion inhibitors. The process of the present invention can be used to effectively remove chromium from cooling tower blow-down as the chromium concentration in treated effluents is, for example, reduced to below the maximum allowable concentration level set by the EPA for effluents to be discharged.

The process of the present invention can be used in municipal water treatment, for example, as a 'polishing' step before final discharge of the effluent following secondary or tertiary treatment methods. Where, for example, carbon beds are used in the removal of metals from effluents, the process of the present invention could further reduce the concentration of elements, particularly those considered to be primary pollutants to acceptable levels for discharge of the effluents.

Following the removal of contaminants from a body of effluent, the poly(dithiocarbamate) resin is recovered from the column or bed. Preferably the resin is enclosed in a container such as a cartridge. The contaminated resin is extracted with deionized water, which preferably has been acidified to a pH of about 5 by the addition of acetic acid, and the extracted solution analyzed for priority pollutants. The poly(dithiocarbamate) resin employed in the process of the present invention rigidly retains the chelated elements and the poly(dithiocarbamate) resin containing the chelated elements can be disposed of in a designated sanitary landfill area. The resin containing the chelated elements does not require the use of a landfill for hazardous wastes (secured landfill).

The novel process of the present invention is further illustrated by the following examples. All parts and percentages are by weight unless specified otherwise.

EXAMPLE 1

Resin Preparation

The poly(dithiocarbamate) resin used for the examples of the present invention was prepared by slowly adding, at room temperature, about 4.0 g of a polymethylene polyphenylisocyanate (supplied by Aldrich Chem. Co.), dissolved in about 10 ml of an aliphatic ether to a stirred solution comprised of about 7.0 g of a 50 percent aqueous suspension of polyethyleneimine (BASF Wyandotte Polymin P), dissolved in about 30 ml of isopropyl alcohol. This produced a precipitate of a polyamine-polyurea precursor resin which, after standing for about 30 minutes, was separated from the reaction solution by filtration. The product was then washed twice with 50 ml of isopropyl alcohol and once with 100 ml of deionized distilled water.

The washed precursor resin was then suspended in about 50 ml of isopropyl alcohol and mixed with 10 ml of concentrated $NH_4OH$ and 30 ml of $CS_2$. After an initial stirring, the mixture was allowed to stand for about 16 hours after which, the reaction product was recovered by filtration. This was washed twice with 50 ml of isopropyl alcohol, twice with 100 ml of deionized distilled water, and finally, again with 50 ml of distilled water and dried. About 6.6 g of finished dried resin having a density of about 0.053 q/l and an average equivalent $Cu^{+2}$ capacity (milliequivalents of copper/gram of dry resin from an aqueous solution at a pH of about 4.8) of about 2.19 was produced. Analysis of the resin showed it to have a sulfur content of about 6 percent.

EXAMPLE 2

A 0.8 cm diameter column was charged with about 1.69 cc of resin of EXAMPLE 1 to a height of about 3.5 cm. A dechlorinated membrane cell brine at a pH of about 7.0 and a temperature of about 80° C. having a composition of about 300 g/l NaCl, 8 g/l $Na_2SO_4$, small amounts of NalCl and $NaClO_3$, with about 5.11 ppm of $Hg^{+2}$ added thereto was passed through the column at a flow rate of about 10 ml/min. for a space velocity value of about 6. The effluent brine on analysis had a mercury content of about 0.044 ppm for a 99+ percent removal. About 1500 ml of solution, having a total of about 7665 micrograms of $Hg^{+2}$, was passed through the column.

At the conclusion of the run, the bed was eluted with 100 ml of 1 M HCl, which extracted about 52 ug of Hg. The bed was then treated with 100 ml of 3 M HCl which extracted an additinal 625 ug of Hg. Finally, the bed was treated with 100 ml of 12 M HCl which, while further extracting about 1560 ug of Hg, caused at least a partial decomposition of the resin, as shown by a pronounced odor of above the bed.

EXAMPLE 3

About 20.3 cc of the resin of EXAMPLE 1 was placed in 1.5 cm diameter column to form a bed approximately 11.5 cm high. Approximately 1 liter of a waste water stream from a chlor-alkali cell containing 64 g/l NaCl
91 g/l $Na_2sO_4$
2.5 g/l $NaClO_3$
0.75 g/l $CaCl_2$ at ambient temperature and an pH of 7 was passed down through the bed at a flow rate of abou 60 ml/min. Analysis of the stream for element contaminant content before and after contact with the resin are shown in Table II below.

TABLE II

| Element | Before (ppm) | After (ppm) | % Removal |
|---|---|---|---|
| Ti | 0.96 | 0.01 | 98.5 |
| As** | 1.20 | 0.82 | 31.6 |
| P | 1.35 | 1.02 | 24.4 |
| Cu** | 0.54 | 0.004 | 99.3 |
| Co | 0.66 | 0.07 | 89.7 |
| Ni** | 0.62 | Not Detected | 100 |
| Pb** | 0.90 | 0.33 | 63 |
| Cr** | 0.67 | 0.048 | 92.8 |
| V | 0.54 | 0.049 | 90.9 |
| Be** | 0.497 | 0.034 | 93.2 |
| Tl** | 0.50 | 0.18 | 63.4 |
| Ag** | 0.396 | 0.018 | 95.5 |
| Cd** | 0.498 | Not Detected | 100 |
| Se** | 0.336 | 0.158 | 53 |
| Zn** | 0.546 | 0.009 | 98.4 |
| Fe | 0.54 | 0.27 | 49.9 |
| Hg** | 0.50 | Not Detected | 100 |

**EPA Priority Pollutants

EXAMPLE 4

EXAMPLE 2 was repeated but with the amount of $Hg^{+2}$ added to the brine being varied. The results obtained are given in Table III below.

TABLE III

| Run No. | $Hg^{+2}$ Conc. in Brine (ppm) | % Removal |
|---|---|---|
| 1 | 10 | 99.6 |
| 2 | 30 | 99.7 |
| 3 | 60 | 99.4 |

TABLE III-continued

| Run No. | $Hg^{+2}$ Conc. in Brine (ppm) | % Removal |
| --- | --- | --- |
| 4 | 80 | 99.6 |
| 5 | 106 | 99.7 |

EXAMPLE 5

Demineralized, deionized water at a pH of 2.2 was spiked with 2.0 ppm of each of the elements listed in Table IV below. The solution was passed through a column of the type of EXAMPLE 2 charged with 2 cc of the poly(dithiocarbamate) resin of EXAMPLE 1. The solution flowed through the column at a rate of 5 ml/minute, with a total of 25 mls of solution being passed through the column. Analysis by argon plasma emission spectroscopy gave the results shown in Table IV below.

TABLE IV

| | DI water at a pH 2.2 | | |
| --- | --- | --- | --- |
| Element | Before (ppm) | After (ppm) | % Removal |
| Ti | 2.00 | 0.597 | 70.15 |
| As | 2.00 | 3.31 | — |
| Mg | 2.00 | 1.81 | 9.50 |
| P | 2.00 | ND | 100 |
| Si | 2.00 | 0.063 | 96.83 |
| Cu | 2.00 | ND | 100 |
| Mn | 2.00 | 1.77 | 11.50 |
| Co | 2.00 | 0.624 | 68.8 |
| Ca | 2.00 | 2.03 | — |
| Ni | 2.00 | 1.31 | 34.5 |
| Pb | 2.00 | ND | 100 |
| Mo | 2.00 | 0.005 | 99.75 |
| Cr | 2.00 | 0.346 | 82.70 |
| Al | 2.00 | 1.47 | 26.5 |
| V | 2.00 | 0.347 | 82.65 |

EXAMPLE 6

The procedure of EXAMPLE 6 was repeated using demineralized, deionized water at a pH of 7.0 and spiked with 0.5 ppm of each of the elements listed in Table V. Analysis by argon plasma emission spectroscopy gave the results shown in Table V below.

TABLE V

| | DI water at a pH of 7.0 | |
| --- | --- | --- |
| Element | Amount (ppm) | % Removal |
| Ti | 0.50 | 99.80 |
| As | 0.50 | 65.9 |
| P | 0.50 | 76.0 |
| Si | 0.50 | — |
| Cu | 0.50 | 100 |
| Co | 0.50 | 98.0 |
| Ni | 0.50 | 100 |
| Pb | 0.50 | 98.2 |
| Mo | 0.50 | 99.6 |
| Cr | 0.50 | 98.6 |
| Al | 0.50 | 99.6 |
| V | 0.50 | 99.6 |
| Be | 0.50 | 98.2 |
| Tl | 0.50 | 98.8 |
| Ag | 0.50 | 92.4 |
| Cd | 0.50 | 100 |
| Se | 0.50 | 100 |
| Sb | 0.50 | 12.4 |
| Zn | 0.50 | 100 |
| Fe | 0.50 | 100 |
| Hg | 0.50 | 100 |

EXAMPLE 7

A solution containing As, Cd Cr, Cu, Hg, Ni, Pb, Se, Sb, and Zn as priority pollution elements was prepared from 1000 µg/ml stock solutions by diluting 10 ml of stock to a total volume of 200 ml with deionized (D.I.) water.

An aliquot (1.005 grams) of dry poly(dithiocarbamate) resin was placed in 100 ml of the above solution for a period of 24 hours. The resin was then removed from the solution by filtration and the resin was washed with about 100 ml D.I. water. The filtrate which includes resin washings was diluted to a total of 500 ml volume with D.I. water.

The amount of metal contained in the resin are given in Table VI below.

TABLE VI

| Element | µg Before − | µg After = | µg on Resin |
| --- | --- | --- | --- |
| Cu | 4690 | 935 | 3755 |
| Cr | 4150 | 3390 | 760 |
| Ni | 4620 | 4445 | 175 |
| Pb | 3930 | 3740 | 220 |
| Cd | 5230 | 4825 | 405 |
| Sb | 6320 | 4405 | 1915 |
| Zn | 5550 | 5250 | 300 |
| Hg | 5740 | 19 | 5721 |
| Se | 5110 | 665 | 4445 |
| As | 4890 | 1025 | 3865 |
| | | TOTAL | 21561 µg |

Weight percent of metals based on the weight of dry resin is 2.16 percent.

The damp resin was weighed (2.002 grams) and placed into a graduated cylinder containing 32 ml of D.I. water. The resin suspension was then agitated for the next 24-hour period.

The pH of the mixture was recorded and then maintained between 4.8–5.2 throughout the 24-hour extraction period by addition of a 0.5 M NaOH solution.

The mixture was then separated by filtration and the filtrate was diluted to a total volume of 40 ml with D.I. water.

The solutions were analyzed by a direct current atomic emission spectrometer and the results are given in Table VII as follows.

TABLE VII

| Element | µg/ml Before | µg/ml After | µg/ml Element Concentration in Leachate |
| --- | --- | --- | --- |
| Cu | 46.9 | 1.87 | 0.11 |
| Cr | 41.5 | 6.78 | 1.64 |
| Ni | 46.2 | 8.89 | .1 |
| Pb | 39.3 | 7.48 | 0.18 |
| As | 48.9 | 2.05 | 0.15 |
| Cd | 52.3 | 9.65 | 0.33 |
| Hg | 57.4 | .038 | 0.003 |
| Se | 51.1 | 1.33 | 0.125 |
| Sb | 63.2 | 8.81 | 1.27 |
| Zn | 55.5 | 10.5 | .1 |

This Example shows that the process of the present invention can be used to remove polluting elements from aqueous effluents and when the resin is spent, it may be disposed of in a unsecured landfill, as shown by the element concentration in the leachate (Reference: 40 CFR 261.24(a)).

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A process for purifying an aqueous effluent containing at least one polluting element dissolved therein which comprises:
   (a) contacting said aqueous effluent with a poly(dithiocarbamate) chelating resin having a sulfur content of from about 6 to about 7 percent whereby the polluting elements are absorbed to form a contaminated poly(dithiocarbamate) chelating resin;
   (b) extracting said contaminated poly(dithiocarbamate) chelating resin with an acidic aqueous solution having a pH of from about 4 to about 6;
   (c) recovering said contaminated poly(dithiocarbamate) resin; and
   (d) depositing said contaminated poly(dithiocarbamate) chelating resin in an unsecured landfill area.

2. The process of claim 1 in which the pH of the aqueous effluent is from about 2 to about 12.

3. The process of claim 2 in which the polluting elements are selected from the group consisting of iron, nickel, cobalt, and mixtures thereof.

4. The process of claim 2 in which the polluting elements are selected from the group consisting of zinc, cadmium, mercury, and mixtures thereof.

5. The process of claim 2 in which the polluting elements are selected from the group consisting of chromium, molybdenum, and mixtures thereof.

6. The process of claim 2 in which the polluting elements are selected from the group consisting of phosphorus, arsenic, and mixtures thereof.

7. The process of claim 2 in which said polluting elements are selected from the group consisting of copper, silver, and mixtures thereof.

8. The process of claim 2 in which said polluting element is titanium.

9. The process of claim 2 in which said polluting element is vanadium.

10. The process of claim 2 in which the pH of said aqueous effluent is from about 6 to about 9.

11. The process of claim 10 in which said polluting element is arsenic, aluminum, and mixtures thereof.

12. The process of claim 2 in which said aqueous effluent is a sodium chloride brine having dissolved therein calcium, magnesium, chlorate, and sulfate ions.

13. The process of claim 12 in which said aqueous effluent has a mercury concentration ranging from about 0.1 to about 130 ppm.

14. The process of claim 13 in which said aqueous effluent further comprises dissolved polluting elements selected from the group consisting of Ti, As, P, Cu, Co, Ni, Pb, Cr, V, Be, Tl, Ag, Cd, Se, Zn, and Fe.

15. The process of claim 14 in which the temperature of said aqueous effluent ranges from ambient to about 100° C.

16. The process of claim 15 in which the space velocity of said aqueous effluent through said resin is between about 2 and about 30 ml brine/min. resin.

17. The process of claim 16 in which said aqueous effluent is anolyte recovered from chlor-alkali electrolytic cell.

18. The process of claim 17 in which said resin is supported on a carrier material selected from the group consisting of diatomaceous earth, pumice stone, zeolite, ground coke, activated charcoal, graphite, bentonite and open cell foamed urethane resins.

19. The process of claim 18 in which said carrier material has a specific surface area of at least 1 m2/g.

20. The process of claim 19 in which said carrier material has a particle size between about 0.05 to about 2.0 mm in diameter.

21. A process for removing beryllium from an aqueous effluent which comprises contacting the aqueous effluent with a poly(dithiocarbamate) chelating resin having a sulfur content of from about 6 to about 7 percent.

22. A process for removing aluminum from an aqueous effluent having a pH in the range of from about 6 to about 9 which comprises contacting the aqueous effluent with a poly(dithiocarbamate) chelating resin having a sulfur content of from about 6 to about 7 percent.

23. A process for removing silicon from an aqueous effluent having a pH in the range of from about 2 to about 6 which comprises contacting the aqueous effluent with a poly(dithiocarbamate) chelating resin having a sulfur content of from about 6 to about 7 percent.

* * * * *

UNITED STATES PATENT AND TRADEMARK OFFICE
CERTIFICATE OF CORRECTION

PATENT NO. : 4,578,195

DATED : March 25, 1986

INVENTOR(S) : Sanders H. Moore, Maurice R. Smith, and Harvey B. Cochran

It is certified that error appears in the above-identified patent and that said Letters Patent is hereby corrected as shown below:

In column 3, line 5, delete "NHOH/CS$_2$" and insert --NH$_4$OH/CS$_2$--.

In column 5, line 29, delete "(m$^2$/q)" and insert --(m$^2$/g)--.

In column 5, line 53, delete "element" and insert --elements--.

In column 6, line 27, delete "soprtion" and insert --sorption--.

In column 7, line 28, between the words "sanitary landfill" and "area" insert --(unsecured landfill) such as a municipal landfill--.

In column 7, line 63, delete "q/l" and insert --g/l--.

In column 8, line 8, delete "NalCl" and insert --NaOCl--.

In column 8, line 19, delete "additinal" and insert --additional--.

In column 8, line 24, after "of" insert --CS$_2$--.

In column 8, line 32, delete "Na$_2$SO$_4$" and insert --Na$_2$SO$_4$--.

In column 8, line 34, after "and" delete "an" and insert --a--.

In column 8, line 35, delete "abou" and insert --about--.

UNITED STATES PATENT AND TRADEMARK OFFICE
CERTIFICATE OF CORRECTION

PATENT NO. : 4,578,195
DATED : March 25, 1986
INVENTOR(S) : Sanders H. Moore, Maurice R. Smith, and Harvey B. Cochran It is certified that error appears in the above-identified patent and that said Letters Patent is hereby corrected as shown below:

In column 9, line 37, after "EXAMPLE" delete "6" and insert --5--.

In column 9, line 66, after "Cd" insert --,--.

In column 10, line 11, delete "metal" and insert --metals--.

In claim 4, line 2, delete "zine" and insert --zinc--.

In claim 16, line 3, after "brine/min." insert --cc.--.

In claim 19, line 2, delete "m2" and insert --$m^2$--.

Signed and Sealed this

Fourteenth Day of October, 1986

[SEAL]

*Attest:*

DONALD J. QUIGG

*Attesting Officer*     *Commissioner of Patents and Trademarks*